United States Patent
Nelson et al.

(10) Patent No.: US 6,688,525 B1
(45) Date of Patent: Feb. 10, 2004

(54) APPARATUS AND METHOD FOR READING A CODED PATTERN

(75) Inventors: David J. Nelson, Rochester, NY (US); Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/401,228

(22) Filed: Sep. 22, 1999

(51) Int. Cl.[7] .................................................. G06K 7/10
(52) U.S. Cl. ............. 235/462.21; 235/454; 235/462.22; 235/462.23; 235/462.45
(58) Field of Search ............................. 235/454, 462.1, 235/462.21, 462.22, 462.23, 462.45, 383, 385, 472, 462.11

(56) References Cited

U.S. PATENT DOCUMENTS

| | | | |
|---|---|---|---|
| 3,582,203 A | 6/1971 | Cox .................................. 353/25 |
| 4,082,426 A | 4/1978 | Brown .............................. 350/105 |
| 4,202,597 A | 5/1980 | Moore ............................. 350/6.6 |
| 4,588,882 A | 5/1986 | Buxton ............................ 235/487 |
| 4,634,850 A | 1/1987 | Pierce et al. .................... 235/462 |
| 4,869,532 A | 9/1989 | Abe et al. ........................ 283/88 |
| 4,924,078 A | * | 5/1990 | Sant'Anselmo et al. .... 235/487 |
| 4,958,064 A | * | 9/1990 | Kirkpatrick ..................... 235/384 |
| 4,983,817 A | 1/1991 | Dolash et al. ................... 235/462 |
| 5,019,699 A | * | 5/1991 | Koenck .......................... 235/472 |
| 5,059,126 A | 10/1991 | Kimball .......................... 382/10 |
| 5,073,954 A | 12/1991 | Van Tyne et al. .............. 235/463 |
| 5,093,147 A | 3/1992 | Andrus et al. .................. 427/7 |
| 5,123,352 A | * | 6/1992 | Luttrell .......................... 101/327 |
| 5,276,472 A | 1/1994 | Bell et al. ....................... 354/76 |
| 5,278,609 A | 1/1994 | Sakaida .......................... 355/45 |
| 5,286,286 A | 2/1994 | Winnik et al. .................. 106/21 A |
| 5,313,235 A | 5/1994 | Inoue et al. .................... 354/76 |
| 5,314,336 A | 5/1994 | Diamond et al. ............... 235/462 |
| 5,325,217 A | * | 6/1994 | Nagler et al. ................... 358/506 |

(List continued on next page.)

FOREIGN PATENT DOCUMENTS

| | | | |
|---|---|---|---|
| EP | 0877523 | * | 11/1998 |
| JP | 409247316 | * | 9/1997 |

OTHER PUBLICATIONS

L. H. Johnston, *Broadband Polarization for the Infrared*, Applied Optics, vol. 16, No. 4, Apr. 1977, pp. 1082–1084.

Warren J. Smith, *Modern Optical Engineering, The Design of Optical Systems*, McGraw–Hill Book Company, p. 87.

*Primary Examiner*—Michael G. Lee
*Assistant Examiner*—U Chau Le
(74) *Attorney, Agent, or Firm*—David A. Novais (57) ABSTRACT

An apparatus and method for reading a coded pattern, symbol or indict such as a barcode. The apparatus and method improves captured resolution with a marker or fiducial input closed loop system. In the present invention, a pre-scan of the pattern, such as a barcode, is performed and fiducials of the barcode are identified. Calculations from these fiducial locations are used to determine the minimum field of view that will substantially capture the fiducials. In an embodiment of the invention, a variable magnification system of the apparatus can be actuated to this minimum field of view and a full resolution final image of the pattern is then captured.

20 Claims, 9 Drawing Sheets

U.S. PATENT DOCUMENTS

| | | | |
|---|---|---|---|
| 5,369,261 A | | 11/1994 | Shamir .................... 235/469 |
| 5,378,883 A | | 1/1995 | Batterman et al. .......... 235/472 |
| 5,396,054 A | | 3/1995 | Krichever et al. .......... 235/462 |
| 5,477,042 A | * | 12/1995 | Wang .................... 235/462.1 |
| 5,478,997 A | * | 12/1995 | Bridgelall et al. .......... 235/462 |
| 5,513,017 A | * | 4/1996 | Knodt et al. ............... 358/471 |
| 5,516,590 A | | 5/1996 | Olmstead et al. ........... 428/484 |
| 5,525,798 A | | 6/1996 | Berson et al. .............. 235/468 |
| 5,525,810 A | * | 6/1996 | Jewell et al. .......... 235/462.06 |
| 5,534,684 A | * | 7/1996 | Danielson .................. 235/472 |
| 5,541,633 A | | 7/1996 | Winnik et al. ............... 347/98 |
| 5,547,501 A | | 8/1996 | Maruyama et al. ....... 106/21 R |
| 5,550,365 A | * | 8/1996 | Klancnik et al. ............ 235/462 |
| 5,569,317 A | | 10/1996 | Sarada et al. ............. 106/21 A |
| 5,583,331 A | | 12/1996 | Dvorkis ...................... 235/462 |
| 5,591,956 A | | 1/1997 | Longacre, Jr. et al. ...... 235/494 |
| 5,612,524 A | * | 3/1997 | Sant'Anselmo et al. .... 235/487 |
| 5,616,909 A | | 4/1997 | Arackellian ................ 235/472 |
| 5,640,001 A | | 6/1997 | Danielson et al. .......... 235/472 |
| 5,656,803 A | * | 8/1997 | Seo ........................... 235/472 |
| 5,684,069 A | | 11/1997 | Auslander ................... 524/88 |
| 5,693,693 A | | 12/1997 | Auslander et al. ............ 524/88 |
| 5,710,417 A | | 1/1998 | Joseph et al. ............... 235/462 |
| 5,719,385 A | * | 2/1998 | Wike, Jr. et al. ............ 235/467 |
| 5,736,725 A | * | 4/1998 | Danielson ................... 235/462 |
| 5,755,860 A | | 5/1998 | Zhu ........................ 106/31.15 |
| 5,756,981 A | | 5/1998 | Roustaei et al. ............ 235/462 |
| 5,766,324 A | | 6/1998 | Ikegaya et al. ........... 106/31.15 |
| 5,793,033 A | | 8/1998 | Feng et al. .................. 235/472 |
| 5,798,515 A | | 8/1998 | Li et al. ...................... 235/472 |
| 5,798,516 A | | 8/1998 | Shreesha .................... 235/472 |
| 5,818,028 A | * | 10/1998 | Meyerson et al. .......... 235/472 |
| 5,821,518 A | * | 10/1998 | Sussmeier et al. .......... 235/462 |
| 5,822,436 A | | 10/1998 | Rhoads ........................ 380/54 |
| 5,834,749 A | * | 11/1998 | Durbin ....................... 235/454 |
| 5,854,478 A | | 12/1998 | Liu et al. .................... 235/462 |
| 5,861,618 A | | 1/1999 | Berson ....................... 235/468 |
| 5,930,531 A | | 7/1999 | Kitagawa et al. ............. 396/55 |
| 5,979,760 A | * | 11/1999 | Freyman et al. ............ 235/454 |
| 5,988,506 A | * | 11/1999 | Schaham et al. ......... 235/462.1 |
| 6,003,773 A | * | 12/1999 | Durbin et al. ......... 235/462.45 |
| 6,019,286 A | * | 2/2000 | Li et al. ..................... 235/454 |
| 6,034,379 A | * | 3/2000 | Bunte et al. ................ 235/472 |

\* cited by examiner

APPARATUS AND METHOD FOR READING A CODED PATTERN

CROSS REFERENCE TO RELATED APPLICATION

The present application is related to U.S. application Ser. No. 09/097,975 filed Jun. 16, 1998, entitled DATA-READING IMAGE CAPTURE APPARATUS, CAMERA, AND METHOD OF USE; U.S. Pat. No. 6,184,534 issued Feb. 6, 2001, entitled METHOD OF PULSING LIGHT EMITTING DIODES FOR READING FLUORESCENT INDICT, DATA READER, AND SYSTEM; U.S. Pat. No. 6,191,406 issued Feb. 20, 2001, entitled DATA-READER SYSTEM HAVING VISIBLE, CENTERLESS TARGETING; U.S. application Ser. No. 09/223,859 filed Dec. 31, 1998 entitled ARTICLE AND METHOD FOR STORAGE OF DATA and U.S. application Ser. No. 09/224,606 filed Dec. 31, 1998, entitled TRANSFERABLE SUPPORT FOR APPLYING DATA TO AN OBJECT.

FIELD OF THE INVENTION

The present invention relates to an apparatus and a method for reading a coded pattern, symbol or indict. More particularly, the present invention relates to a barcode reader and method for improving captured resolution with a fiducial input closed loop system.

BACKGROUND OF THE INVENTION

In situations where coded patterns, symbols or indict such as a barcode are being read, such as by using a handheld barcode reader or scanner, there is a certain degree of "overhead" built into reading systems of the barcode reader. This is done in order to accommodate misalignment and improper sizing of the barcode within the image sensor area of the barcode reader. This "overhead" is in the form of unused pixels of the image sensor area around the pixels which record the barcode itself. In many instances this overhead is not troublesome because the barcode is of significantly lesser resolution than the sensor, meaning that even when ineffectively oriented in relation to the barcode, the barcode reader still has the resolution required to capture the entire barcode image.

This "overhead" can become a problem when the resolution of the sensor is not significantly greater than that required to image the barcode. This is the case when a low-resolution sensor is selected for an application for cost reasons. Also, this is the case while imaging two dimensional barcode formats which encode large amounts of data with a hand held reader. Storing sound files as invisible encodements and capturing them with a hand held reader is an example of a system that would benefit from this invention (see, for example, co-pending applications U.S. Ser. No. 09/122,502 and U.S. Ser. No. 08/931,525, as well as U.S. Pat. No. 5,313,235.

Due to the cost of two dimensional CCD and CMOS sensors increasing with increased resolution, for any application it is desirable to maximize the number of pixels which are used to capture meaningful barcode data.

U.S. Pat. No. 5,378,883 discloses a barcode reader with variable optics capable of reading over large distance ranges. The focal length of the lens however is determined by a distance measurement to the target, and therefore is not ideally suited to imaging barcodes of significantly different sizes.

U.S. Pat. No. 5,710,417 provides the ability to alter the aspect ratio, image resolution, and size of a captured image in a bar code reader, however these changes to the scanner must be programmed into the unit and therefore are not closed loop based on a pre-scanned image analysis.

Marker beams and other aiming aids such as framing devices (U.S. Pat. No. 5,793,033) are often used to try to minimize the problem solved by this invention. Any of these methods still rely exclusively on the proper operation and skill of the operator to achieve the desired result.

Conventional arrangements as well as the above-mentioned patents do not disclose or suggest a closed loop system for correcting improper focal length, skew or aiming based on a pre-scan of an image to locate image fiducials.

SUMMARY OF THE INVENTION

An object of the present invention is to provide for a barcode reader and method which improves the resolution of captured barcode images.

The present invention relates to a method for reading a coded pattern. The method comprises the steps of performing a pre-scan on the pattern by using a reader having imaging optics; identifying a marker arrangement on the pattern; determining a minimum field of view that will substantially capture the marker arrangement; actuating a variable magnification imaging system to the minimum field of view; and capturing a full resolution final image of the pattern.

The present invention also relates to an apparatus for reading a coded pattern. The apparatus comprises an illumination source for illuminating a pattern within a field of view; a sensor onto which the pattern is imaged; imaging optics which image the pattern onto the sensor at a first magnification; and a processing unit adapted to receive a signal from the sensor indicative of the imaged pattern, perform a pre-scan of the imaged pattern, and locate a marker arrangement on the pre-scanned pattern. The processing unit controls the imaging optics to set a second magnification and to perform a final scan on the imaged pattern at the second magnification.

In one example of an embodiment of the present invention, a barcode reader for capturing barcode files uses a zoom lens which, based on feedback from a prior scan of the barcode is capable of changing the focal length to optimize the scan of the barcode. An implementation of this invention has the marker arrangement in the form of two distinct markers in opposing corners of the printed barcode. After sensing their position in the pre-scanned frame, the reader zooms to an optimal position for maximizing the resolution of the sensor. A further feature of the invention incorporates the above embodiment, and also includes additional corrections to compensate for skew and aim using the same methodology.

The barcode reader and method of the example of the present invention described above improves the resolution of captured barcode images by limiting the number of unused pixels on the sensor of the barcode reader by: performing a pre-scan of the barcode image, identifying sensor pixel locations containing coner fiducials of the barcode, performing calculations from these sensor locations to determine the maximum lens focal length that will still capture these coner fiducials, actuating a zoom lens on the barcode reader to this focal length, and capturing a full resolution final image.

BRIEF DESCRIPTION OF THE DRAWINGS

The above-mentioned and other features and advantages of this invention and the manner of attaining them will become more apparent by reference to the following description of the invention taken in conjunction with the accompanying figures wherein.

DETAILED DESCRIPTION OF THE INVENTION

Figure 1A:
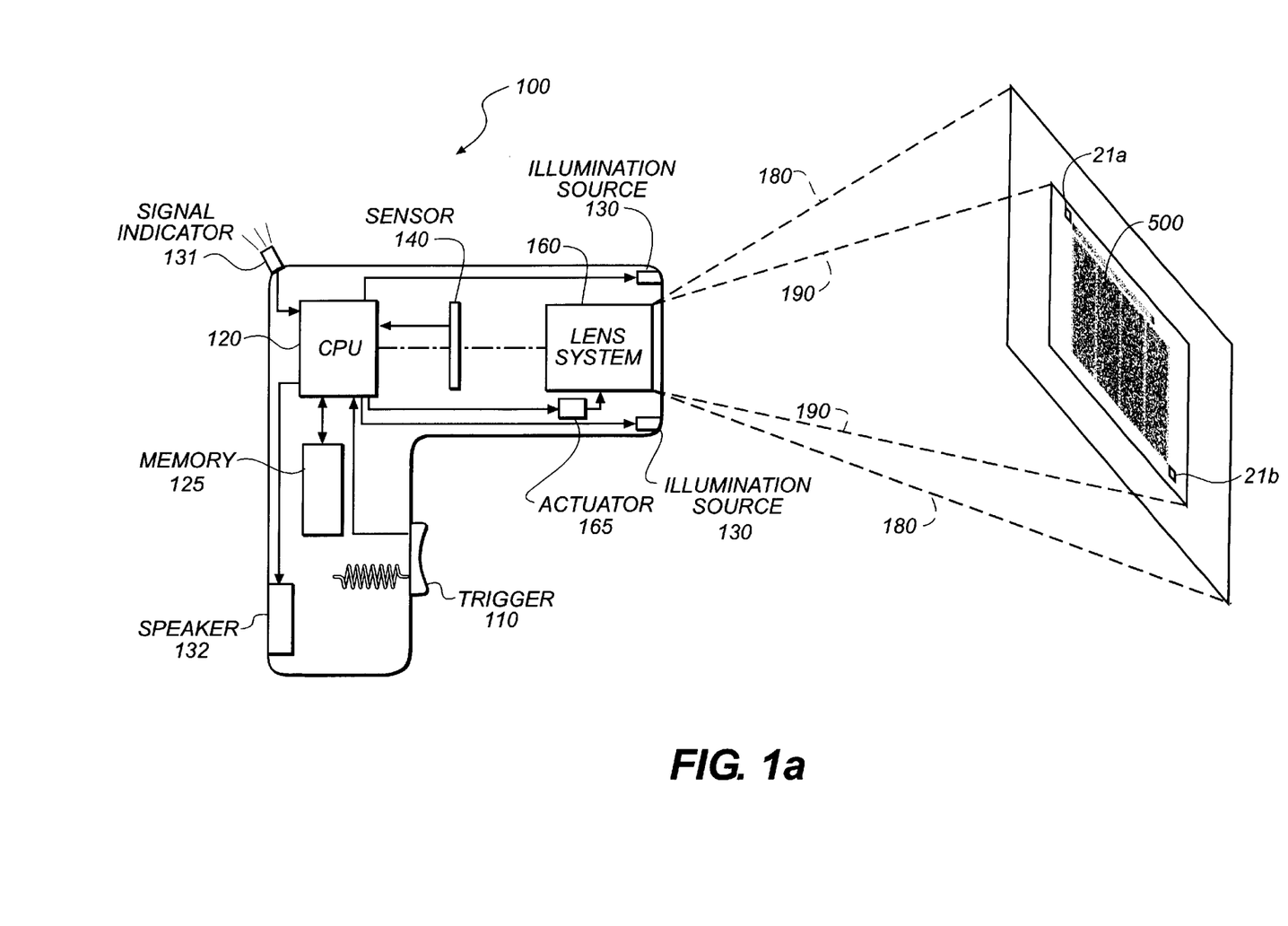
FIG. 1a shows a schematic representation of a barcode reader in accordance with a first embodiment of the invention.

Referring now to the drawings, wherein like reference numerals represent identical or corresponding parts throughout the several views, FIG. 1a shows a barcode reader 100 in a schematic view. Barcode reader 100 is oriented so as to read or scan a coded pattern, symbol or indict such as a barcode 500. Barcode reader 100 includes imaging optics such as a lens system 160, which is initially set to a widest field of view 180 for a pre-scan step. Lens system 160 can be a known variable magnification system. A low-resolution pre-scan image is taken when the user activates a trigger 110. In response thereto, a central processing unit (CPU) 120 operationally associated with a memory 125 sends a command to illumination sources 130 to illuminate field of view 180. Barcode 500 is imaged onto a sensor 140 at a first magnification, and in a manner which will be described later, a marker arrangement in the form of coner markers, points or fiducials (21a, 21b) that which is precoded on the pattern, are located through an algorithm residing in CPU 120. A correction factor for focal length is determined based upon the location of the coner markers in the xy plane of sensor 140, and a signal can be sent to an actuator 165 to move a lens element (not shown) of variable magnification system 160 to a position (second magnification) determined through a look up table for the desired correction factor. CPU 120 then takes a final high-resolution image using a reduced field of view indicated by 190 or a minimum field of view that will substantially capture fiducials 21a, 21b. After the final scan is complete, in the embodiment of FIG. 1a, a signal indicator 131 alerts the user that the scan is complete and that it is no longer required to hold reader 100 still. This particular embodiment incorporates a speaker 132 as indicative of one possible final output of the scan, though it is not critical to the invention. Also, the invention is not limited to use of a signal indicator 131 to alert the user that the scan is complete. It is recognized that any type of visual or sound indicator device can be utilized.

Figure 1B:
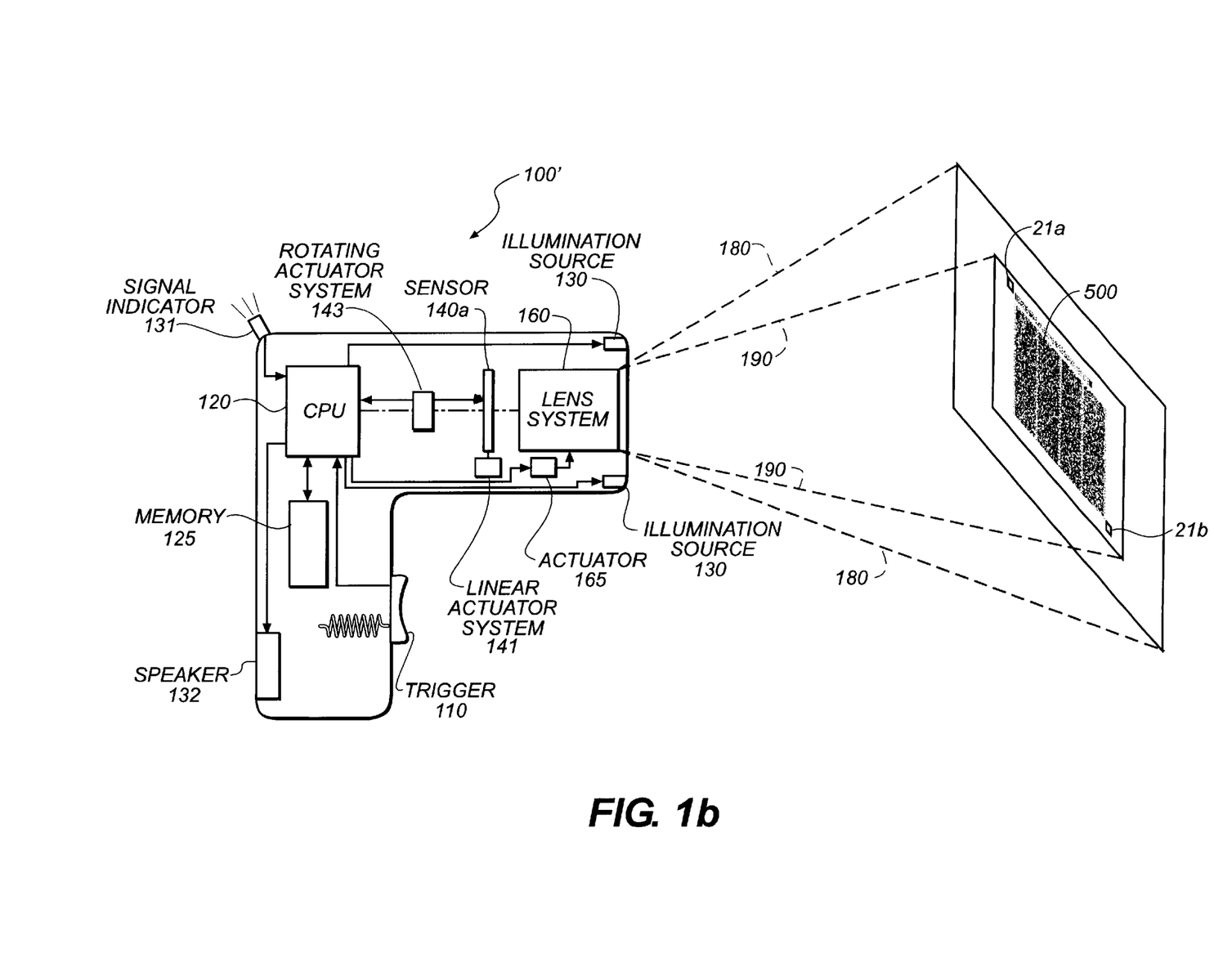
FIG. 1b shows a schematic representation of a barcode reader in accordance with a second embodiment of the invention.

Turning now to FIG. 1b, a similar barcode reader 100' is shown with additional capabilities. As before, variable magnification system 160, is initially set to its widest field of view 180 for the pre-scan step. This is accomplished by moving a lens of lens system 160 in a known manner using actuator 165. The low-resolution pre-scan image is taken when the user activates trigger 110. CPU 120 sends a command to illumination sources 130 to illuminate field of view 180. In this embodiment, barcode 500 is imaged onto a flexure-mounted sensor 140a, and the corner markers, points or fiducials (21a, 21b) are located through the algorithm residing in CPU 120. As before and in a manner which will be described later, a correction factor for focal length is determined based upon the location of the coner points in the xy plane of sensor 40a, and a signal is sent to actuator 165 to move a lens (not shown) of lens system 160 to a position determined through a look-up table for the desired correction factor. In addition, similar correction factors for centering sensor 140a in x and y with the center of barcode 500 image are generated. These correction factors for x and y position are then translated into moving sensor 140a in x and y through linear actuator system 141 (it is understood that linear actuator system 141 can include an x-direction actuator and y-direction actuator). Then the skew correction is similarly implemented with a rotating actuator system 143 such that sensor 140a is aligned with barcode 500. CPU 120 then takes the final high-resolution image using the corrected reduced field of view indicated by 190. After the final scan is complete, a signal indicator 131 can alert the user that the scan is complete and that it is no longer required to hold reader 100' still. This particular embodiment incorporates speaker 132 as indicative of one possible final output of the scan, though it is not critical to the invention. Also, actuator systems 141 and 143 are shown for moving sensor 140a. However, the invention is not limited thereto and other linear movement and rotating systems can be used for moving sensor 140a.

Figure 1C:
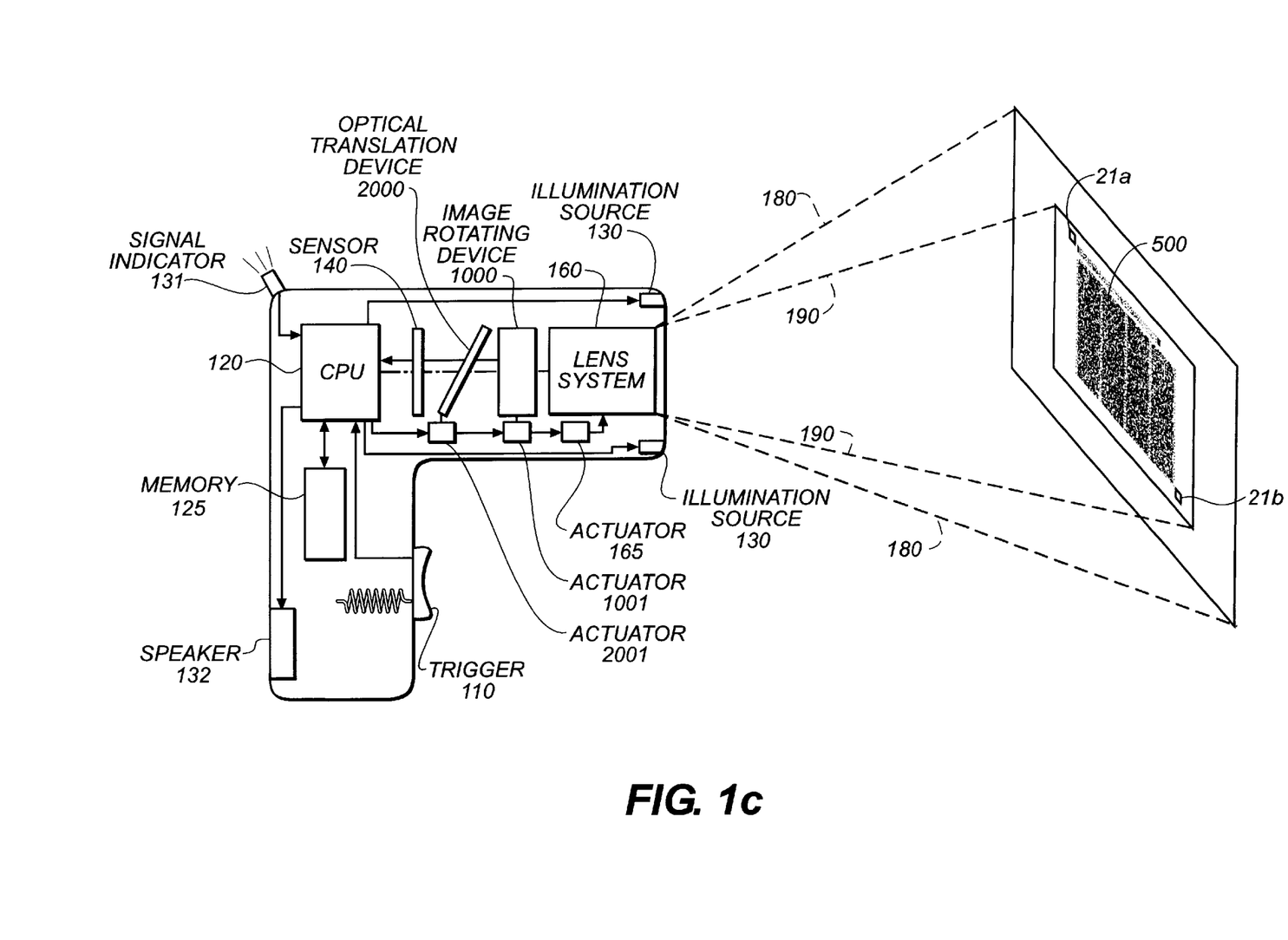
FIG. 1c shows a schematic representation of a barcode reader in accordance with a third embodiment of the invention.

Also, as a further option, for skew correction, rather than rotating sensor 140a, it is recognized that the image can be rotated optically while the sensor is fixed. Systems for optically rotating an image are known in the art. For example, as schematically shown in the third embodiment of FIG. 1c, an image rotating device 1000, such as a Dove Prism or a K-mirror (three mirror rotator) (see, for example, Applied Optics, Volume 16, No. 4, April 1977) can be inserted between barcode 500 and sensor 140. Image rotating device 1000 includes an actuator 1001 as schematically shown in FIG. 1c for rotating image rotating device 1000. The embodiment of FIG. 1c is similar to the embodiment of FIG. 1b but includes a fixed sensor 140 as shown in FIG. 1a and image rotating device 1000 as described above. It is noted that image rotating device 1000 can be inserted anywhere along the optical axis and that the location of image rotating device 1000 as illustrated in FIG. 1c is shown only for explanation. A feature of this embodiment involves the rotation of one of the image of the barcode 500 or sensor 140 with respect to the other one.

In addition to optically rotating the image to correct for skew, as described above, an image can be optically translated to provide for aim correction. A further embodiment of the invention with respect to aim correction involves placing an optical translation device 2000 such as a plane parallel plate between the object (barcode 500) and sensor 140. Optical translation device 2000 can include an actuator 2001 for moving translation device 2000. Optical translation device 2000 is mounted in such a way to allow tilting in the plane of sensor 140.

It is further possible to vary magnification either by modifying the object and image distance for a fixed focal length lens or by using a conventional zoom lens which varies its focal length.

Also, rather than varying the magnification by moving the lens element, it is recognized that the magnification can be varied by dropping in a new lens. For example, multiple lenses can be provided on a turret which is rotated to provide the desired lens and magnification.

Figure 2:
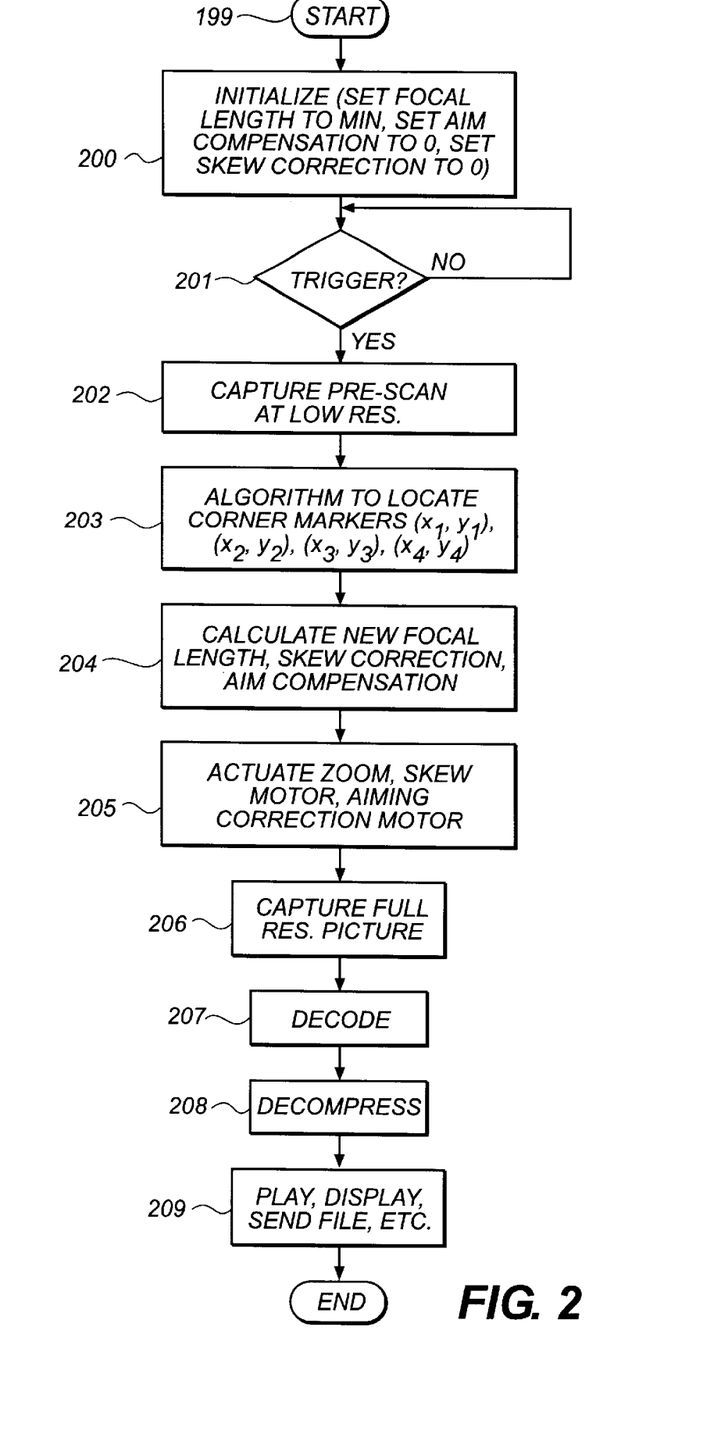
FIG. 2 is flowchart showing the steps involved in the invention.

FIG. 2 shows a flowchart describing the operation of the barcode reader of the present invention. When switched on (start, step 199), the reader goes through an initialization step (200) in which the focal length is set such that the maximum field of view 180 is captured, and the aim correction and skew correction actuators (for the embodiments of FIGS. 1b and 1c) are moved to their home positions (no correction). The bar code reader is now ready to capture a pre-scan. This step is performed when trigger 110 on the reader is pressed by the user (step 201). The pre-scan is then captured using lens system 160 and sensor (140 or 140a) under the control of CPU 120 (step 202). An algorithm to find the coordinates of the corner markers, points or fiducials 21a, 21b is then performed on the low-resolution pre-scanned image (step 203). From the location of these corner markers (x1, y1, x2, y2, x3, y3, x4, y4) on the sensor, a new focal length, as well as two aiming correction factors, and a skew correction factor (for the embodiments of FIGS. 1b and 1c) are calculated (step 204). The various actuators controlling the lens system and the sensor xy position, and the sensor skew are then moved to the optimal positions through the use of look up tables with the correction factors as inputs (step 205). After the actuators are in their final positions, a fill resolution image is captured (step 206). A signal is transmitted to let the user know that the scan is complete, and the full resolution image is then decoded (step 207), decompressed if necessary (step 208), and used for its intended purpose (step 209), such as playback of an audio file through speaker 132.

Figure 3:
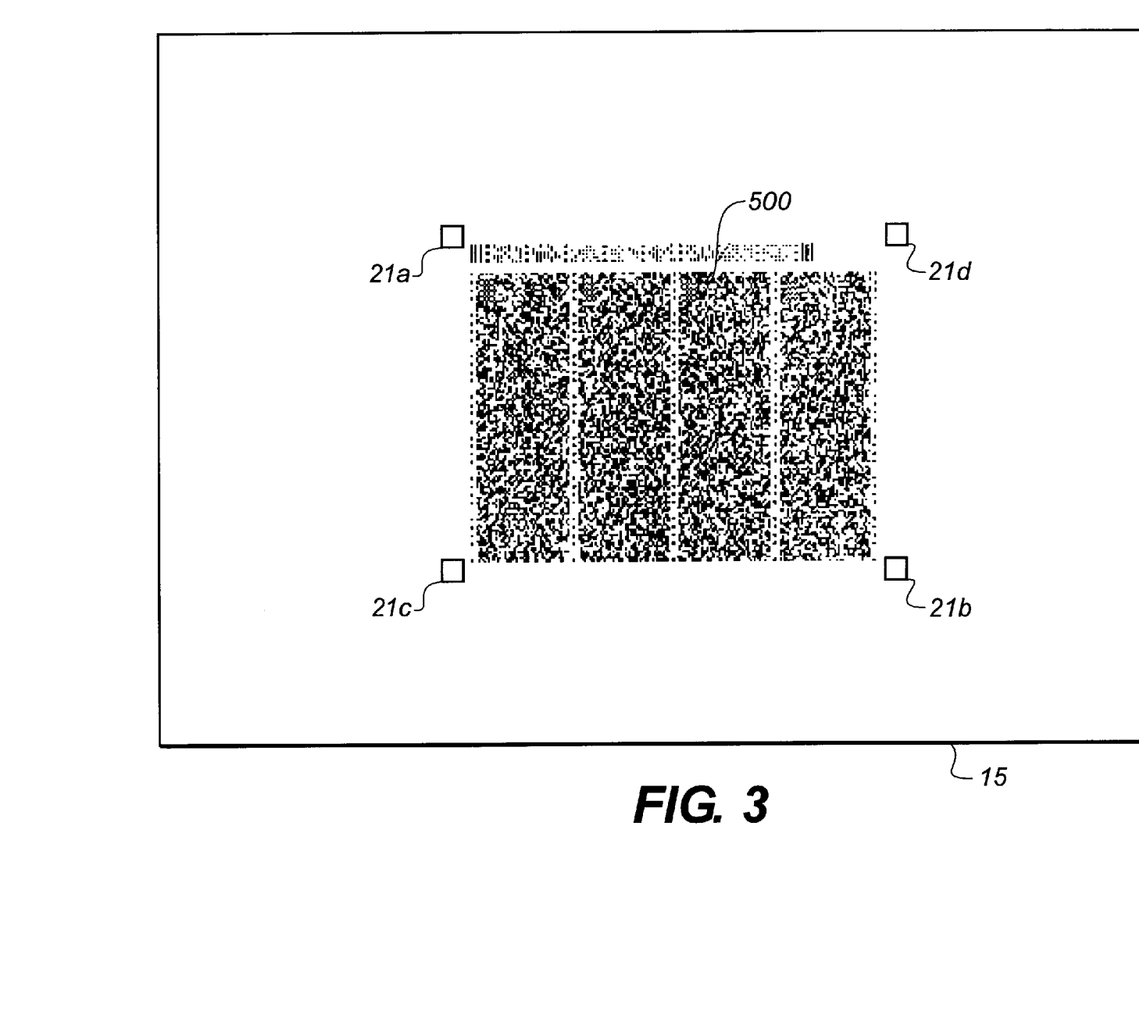
FIG. 3 is a barcode format with coner locating points.

FIG. 3 shows barcode 500 with a marker arrangement in the form of corner locating points, markers or fiducials 21a–21d. The format of barcode 500 is not critical to the invention, and could be one of many commonly accepted formats such as PDF 417, or Paperdisk from Cobblestone Software (which is shown), etc.

Barcode 500 however should have a marker arrangement in the form of at least two easily recognizable fiducials in opposed corners. FIG. 3 shows four fiducials 21a–21d one delineating each corner. These fiducials should be easily recognizable because the time between the pre-scan and final scan is desired to be minimized to reduce the effect of the user moving the hand held reader in between. If the fiducials are not easily recognizable, considerable time must be expended running algorithms to identify them. A fiducial can be easily recognizable based on any of a number of features including size, shape, differing reflectance, etc. The differing reflectance can be achieved through the use of different materials such as retroreflective materials disclosed by in U.S. Pat. No. 4,082,426. Likewise, these fiducials could be of a non-visible material and/or of a material which absorbs or emits at a different wavelength than the barcode itself. It would also be possible to retrofit existing barcodes with the application of stickers in the corners to serve as the coner fiducials.

Rather than adding a different material from the barcode it is also potentially desirable to alter the format of the barcode to incorporate coner fiducials of significantly differing size or shape from the portion of the code which is encoding the data. This makes the creation of the barcode much simpler. Such locating fiducials are commonly used in many barcode formats to determine a reference position for the decoding of the data. For example there are "landmarks" employed by Cobblestone software in their encodement, Paperdisk, for the purpose of locating and orienting the scan. These location marks are currently used in the decoding step only. This invention uses the fiducials as a means to obtain an optimal scan of the image. As it is desirable for the pre-scan time to be minimized, a low-resolution scan is preferred. As such, the fiducial marks may be significantly larger than the markings used to encode the data, which will be read in the final scan.

Figure 4:
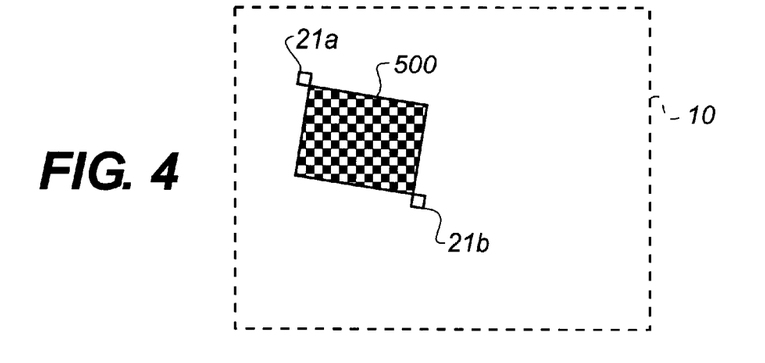
FIG. 4 is the barcode format of FIG. 3 captured in a pre-scan step.

FIG. 4 shows the image as taken by sensor 140 or 140a of a typical initial pre-scan. One can see that barcode image 500 is neither centered, aligned, nor taken at the optimal focal length to maximize the effective resolution of sensor 140 or 140a within an imaged area 10.

Figure 5:
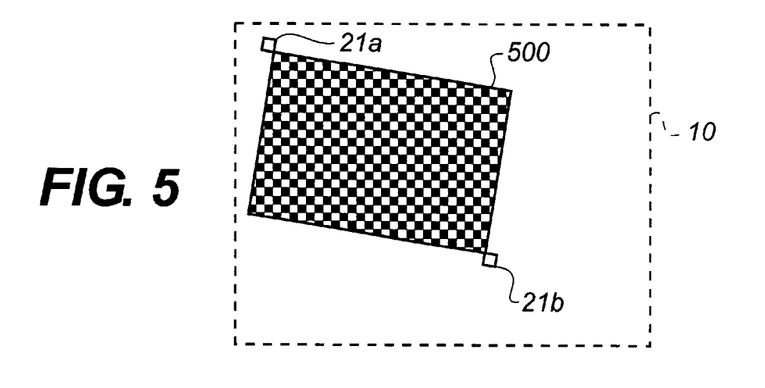
FIG. 5 illustrates the final version of the barcode as it is captured using the zoom only aspect of the invention.

FIG. 5 shows the result after the focal length correction of the first embodiment of FIG. 1a has been implemented. Because this embodiment does not incorporate any aim or skew correction, it is only possible to increase the focal length until the portion of the code closest to an edge in the initial pre-scan is imaged as close as possible to that edge. This point is later referred to as the "boundary point".

Figure 6:
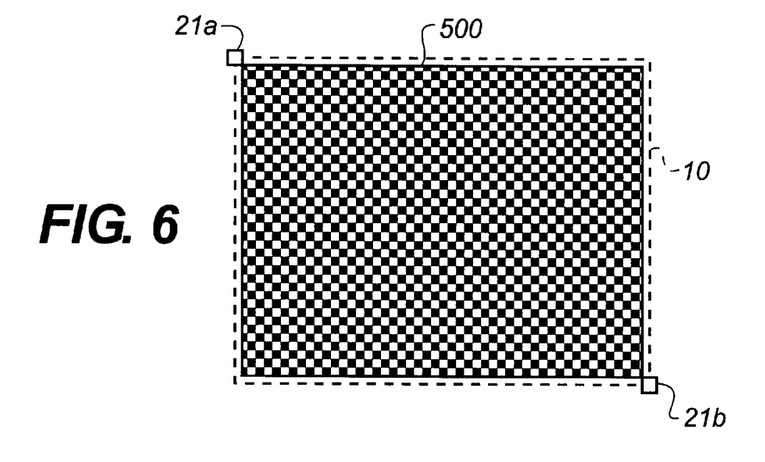
FIG. 6 illustrates the final version of the barcode as it is captured using the skew, aim and focal length correction of the second preferred embodiment.

FIG. 6 shows the result after the focal length, skew, and aiming correction of the second embodiment of FIG. 1b have been implemented. This final scan exhibits all of the corrections, and maximizes the mapping of the barcode pixels to the sensor pixels. Corner marking fiducials 21a, 21b are shown outside of the imaged area 10, as they do not actually encode useful data. This may or may not be desirable, and can be altered in the look-up table for focal length.

Figure 7:
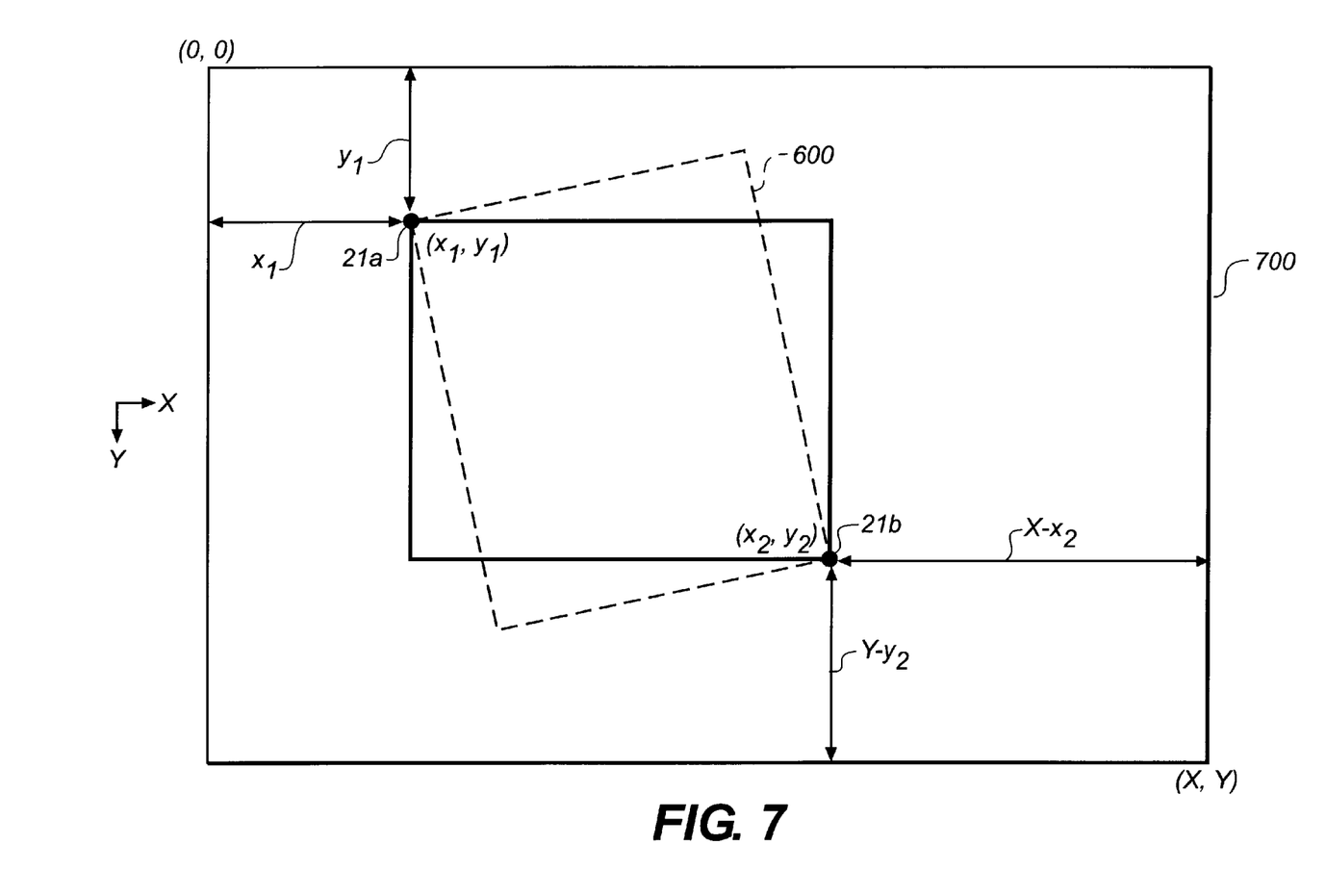
FIG. 7 illustrates the simple algorithm as applied to a barcode with only two opposed coner-locating points to change the focal length of the lens.

FIG. 7 shows a pre-scan of a barcode with just two corner fiducials 21a, 21b and will be utilized to describe the algorithm to locate the coner markers or fiducials. From this pre-scan, the coner fiducials are detected and stored as the co-ordinates (x1, y1) and (x2, y2). An overall sensor area 700 is assigned the co-ordinates (0,0) and (X,Y) which represents the number of horizontal and vertical pixels of the sensor. Using a zoom lens as an example, when altering the focal length of the zoom lens all of the points will be mapped radially from the center of the sensor towards the outside of the imaged frame. Therefore, without aim or skew correction the point which is closest to the boundary in either the x or y direction becomes the "boundary point", or the one which limits the increase in focal length. The following distances are determined: x1, X-x2, y1, and Y-y2. The point representing the minimum of these distances is then denoted the boundary point, and the focal length to which the lens can be zoomed is determined by using this point in a look-up table stored in a memory 125 (FIGS. 1a–1c).

In the case where there are only two corner fiducials, it is desired that the focal length not be increased to the maximum value for the boundary point. This is because a skew 600 is not known (unless the aspect ratio of the barcode is first known) and the possibility exists for one of the unlocated corners of the barcode to be closer to the outside of the imaged frame than the "boundary point". As noted in FIG.

7, the same corner points (x1, y1) and (x2, y2) would be determined for both skewed and properly oriented images. It is therefore desirable to maintain a buffer area around the corner fiducials to assure that the entire barcode is imaged in the final scan.

Figure 8:
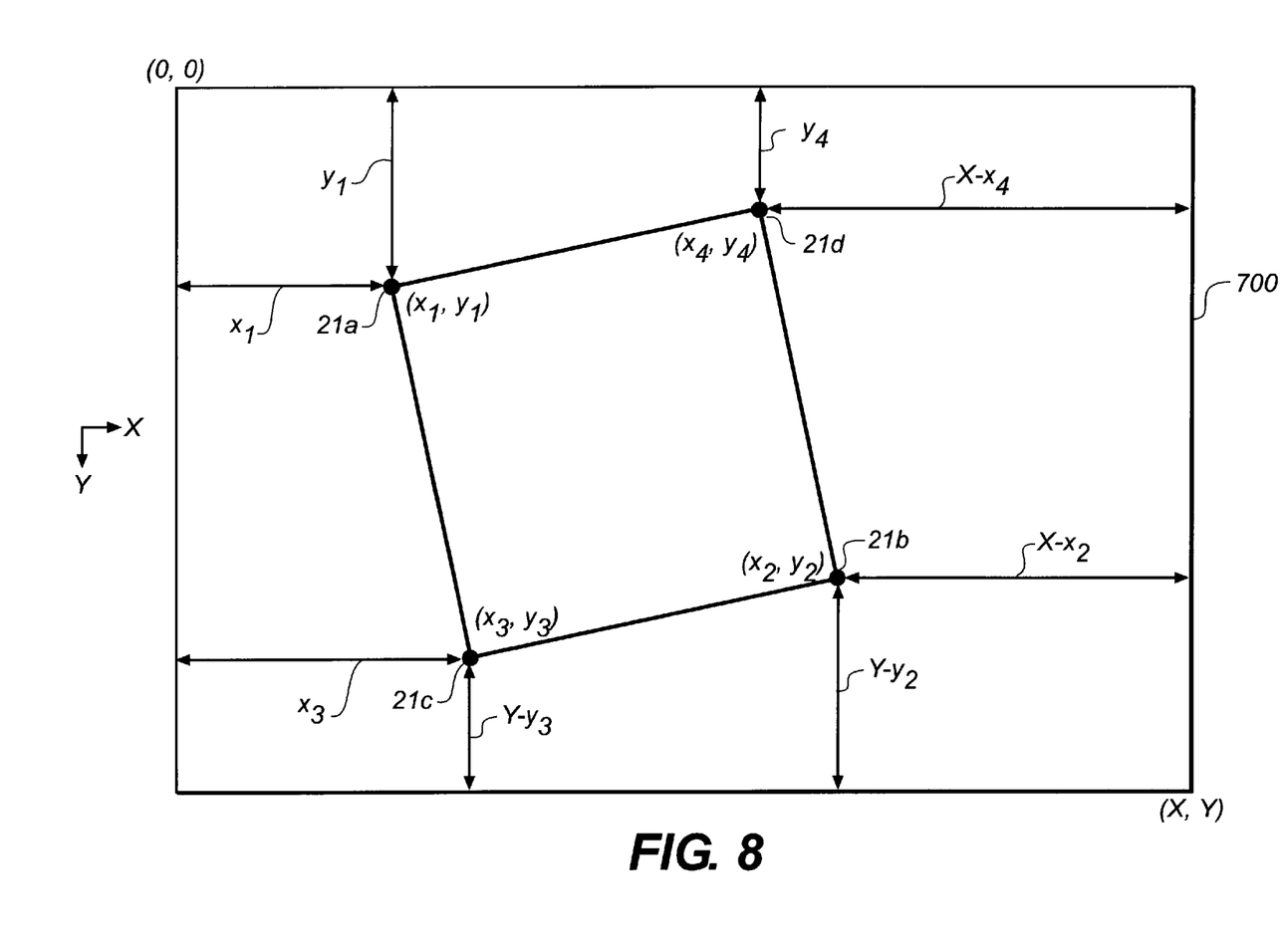
FIG. 8 illustrates the simple algorithm when used with a barcode containing four coner-locating points to change the focal length of the lens.

FIG. 8 shows the case where all four fiducials are being used. The coner points found in the pre-scan are labeled (x1, y1), (x2, y2), (x3, y3), and (x4, y4). The sensor is again labeled (0, 0) and (X, Y). The same methodology is used to determine the focal length compensation. The minimum distance to the edge is again determined from the following candidates: x1, x3, X-x4, X-x2, y1, y4, Y-y3, Y-y2.

The boundary point is again determined, and used to determine the focal length correction factor. As there is no longer ambiguity about the absolute corner locations, full compensation can be made.

Figure 9:
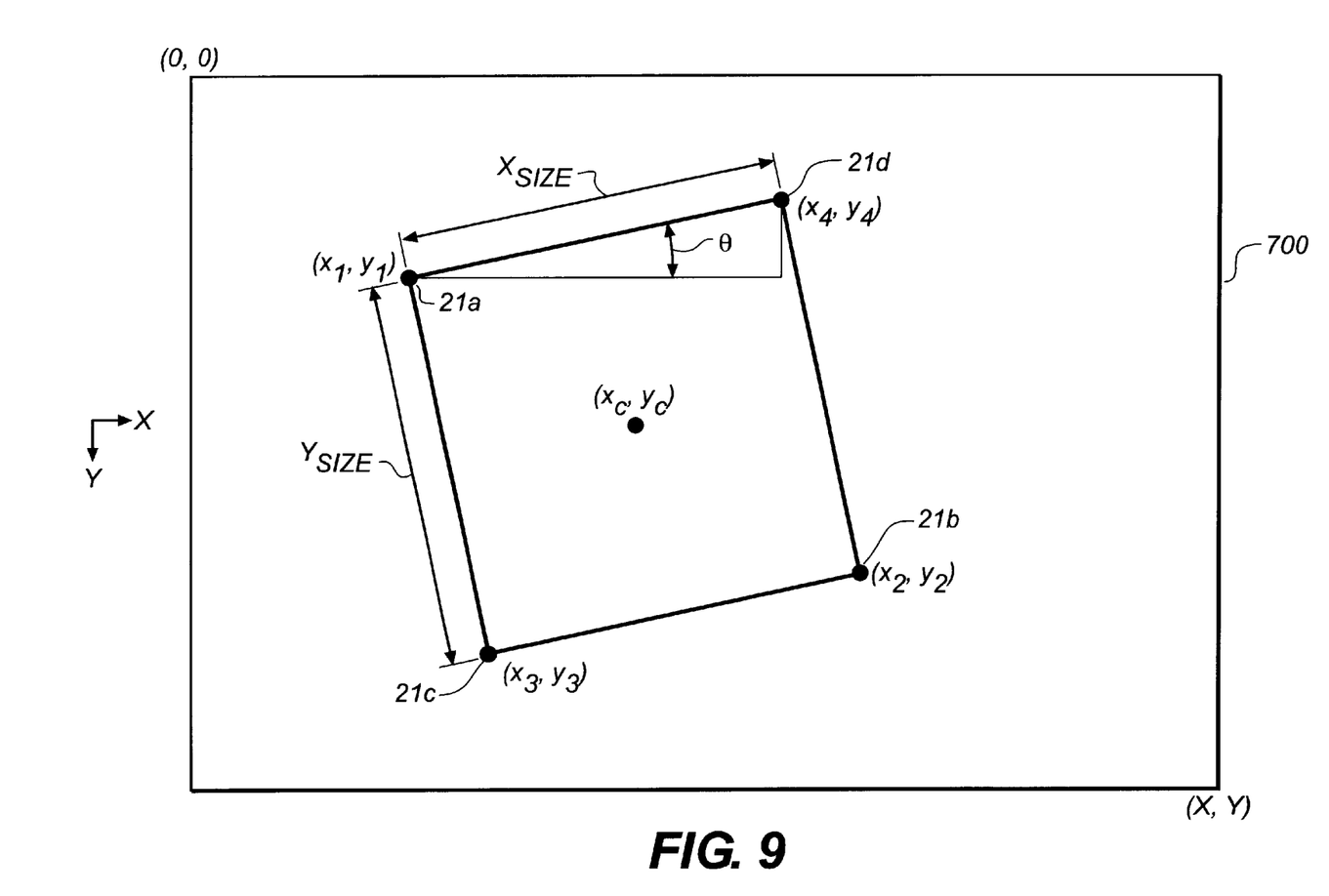
FIG. 9 illustrates the complete algorithm when used with a barcode containing four coner locating points to optimize the focal length, skew and aim of the reader.

FIG. 9 illustrates the second embodiment of the algorithm. As before, the coner points are determined (x1, y1), (x2, y2), (x3, y3), and (x4, y4) and the sensor is labeled with (0, 0), and (X, Y). In this case however the algorithm used is different because skew and aiming correction are now enabled by the flexure-mounted sensor 140a and associated actuators 141 and 143, or the image rotating and translating optics 1000, 2000 with associated actuators 1001, 2001.

Firstly, the center position of the barcode is determined by averaging either set of opposing corner fiducials:

$$(x_c, y_c) = \left( \frac{x2 - x1}{2}, \frac{y2 - y1}{2} \right)$$

This center point is used to determine the aiming correction factors required to center the image on the sensor (Xaim and Yaim).

Secondly, the angle at which the captured prescan was skewed is calculated from the following formula:

$$\theta = \tan^{-1}\left( \frac{|y4 - y1|}{|x4 - x1|} \right)$$

This skew angle is used to control the skew actuator 143 in order to align the sensor to the imaged barcode.

Finally, the focal length correction is determined from the size of the image barcode in the pre-scan and the known size of the sensor. The size of the pre-scan image can be calculated from:

$$Xsize = \sqrt{(x4-x1)^2 + (y4-y1)^2}$$

$$Ysize = \sqrt{(x3-x1)^2 + (y3-y1)^2}$$

Depending on the aspect ratio of the barcode compared to the aspect ratio of the sensor, unless the two are identical, one of these size parameters will determine the limit of the focal length increase that can be applied.

Although the present description makes reference to a hand-held reader, the present invention is not limited thereto. It is recognized that the features of the invention are also applicable to barcode readers which are fixedly mounted or stationary.

Further, it should be noted that skew and aiming correction could be accomplished in a number of different ways, and moving the sensor with respect to the optics as described is just an example. As another example, in many conventional bar code readers, a linear sensor is used. In such a case, the extent of travel of scan mirrors can be altered to adjust the aiming of the device.

Also, the barcodes as described can be placed on any object or media which is desired to be identified, described, located, etc. Further, the features of the present invention can be applied to the concept of capturing information, such as from a barcode as described, for the purpose of orienting the object or media on which the barcode is placed.

It is also noted that locating the fiducials in the coner of a rectangular barcode is a preferred embodiment and has been used for illustrative purposes in this description. It is recognized to one skilled in the art that other possibilities exist for performing the described closed loop magnification, skew and aim correction using, for example, a diagonal line, two parallel lines, a border around the barcode, etc.

The invention has been described in detail with particular reference to certain preferred embodiments thereof, but it will be understood that variations and modifications can be effected within the spirit and scope of the invention.

What is claimed is:

1. A method for reading a coded pattern, the method comprising the steps of:
   using a reader having a variable magnification imaging system set at a widest field of view to perform a pre-scan on the pattern, said pattern having a pre-coded marker arrangement thereon;
   identifying the pre-coded marker arrangement on the pattern;
   determining a minimum field of view that will substantially capture said pre-coded marker arrangement;
   actuating the variable magnification imaging system to said minimum field of view; and
   capturing a full resolution final image of the pattern.

2. A method according to claim 1, wherein said pattern is a barcode and said pre-coded marker arrangement comprises at least two corner fiducials of said barcode.

3. A method according to claim 1, wherein said pre-coded marker arrangement comprises fiducials which are made of a retroreflective material.

4. A method according to claim 1, wherein said pre-coded marker arrangement comprises fiducials which are made of a material which absorbs or emits at a different wavelength than that of the pattern.

5. A method according to claim 1, wherein said pre-coded marker arrangement comprises fiducials which are removably attached to said pattern.

6. A method according to claim 1, comprising the further step of centering said pattern prior to said step of capturing a full resolution final image of said pattern.

7. A method according to claim 1, comprising the further step of correcting a skew of said pattern prior to said step of capturing a full resolution final image of said pattern.

8. A method according to claim 1, wherein said step of performing a pre-scan of said pattern comprises performing pre-scan at a resolution which is less than a resolution at a final scan.

9. An apparatus for reading a coded pattern, the apparatus comprising:
   an illumination source for illuminating a pattern within a field of view, said pattern having a pre-coded marker arrangement thereon;
   a sensor onto which the pattern is imaged;
   imaging optics which image the pattern onto said sensor at a first magnification; and
   a processing unit adapted to receive a signal from said sensor indicative of the imaged pattern, perform a pre-scan of the imaged pattern with said imaging optics being set at a widest field of view, and locate said pre-coded marker arrangement on the pre-scanned pattern, said processing unit controlling said imaging optics to provide for a minimum field of view that will substantially capture said pre-coded marker arrangement and set a second magnification so as to perform a final scan on said imaged pattern at said second magnification.

10. An apparatus according to claim 9, wherein said pattern is a bar code and said pre-coded marker arrangement comprises fiducials located at least at first and second corners of said barcode.

11. An apparatus according to claim 9, wherein said pre-scan is at a low resolution and said final scan is at a resolution which is higher than said pre-scan resolution.

12. An apparatus according to claim 9, further comprising an actuator which is adapted to receive a signal from said processor and adjust a position of said sensor to correct a skew of said imaged pattern.

13. An apparatus according to claim 9, further comprising an actuator which is adapted to receive a signal from said processor and adjust a position of said sensor to center said imaged pattern.

14. An apparatus according to claim 9, further comprising an image rotating device for optically rotating said imaged pattern to correct a skew of said imaged pattern, said image rotating device being located along an optical axis of said apparatus.

15. An apparatus according to claim 9, further comprising an optical translation device for optically translating said imaged pattern to center the imaged pattern, said optical translation device being located along an optical axis of said apparatus.

16. An apparatus according to claim 9, wherein said pre-coded marker arrangement comprises fiducials which are made of a retroreflective material.

17. An apparatus according to claim 9, wherein said pre-coded marker arrangement comprises fiducials which are made of a material which absorbs or emits at a different wavelength than that of the pattern.

18. An apparatus according to claim 9, wherein said pre-coded marker arrangement comprises fiducials which are removably attached to said barcode.

19. An apparatus according to claim 9, further comprising an indicator which indicates a completion of said final scan to a user.

20. An apparatus according to claim 19, wherein said indicator is a visual indicator.

* * * * *